(12) United States Patent
Lee et al.

(10) Patent No.: US 11,409,381 B2
(45) Date of Patent: Aug. 9, 2022

(54) DIGITAL PEN FOR CHARGING BATTERY AND METHOD FOR OPERATING SAME

(71) Applicant: Samsung Electronics Co., Ltd., Suwon-si (KR)

(72) Inventors: Joohoon Lee, Suwon-si (KR); Byunghoon Kang, Suwon-si (KR); Changbyung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 17/264,150

(22) PCT Filed: Aug. 9, 2019

(86) PCT No.: PCT/KR2019/010106
§ 371 (c)(1),
(2) Date: Jan. 28, 2021

(87) PCT Pub. No.: WO2020/032708
PCT Pub. Date: Feb. 13, 2020

(65) Prior Publication Data
US 2021/0349553 A1 Nov. 11, 2021

(30) Foreign Application Priority Data
Aug. 9, 2018 (KR) .......................... 10-2018-0093398

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *H02J 50/12* (2016.02);
(Continued)

(58) Field of Classification Search
CPC ............... G06F 3/0383; G06F 3/03545; G06F 2203/0384; G06F 2200/1632;
(Continued)

(56) References Cited

U.S. PATENT DOCUMENTS 5,483,262 A * 1/1996 Izutani .................. G06F 1/1626
345/905
6,262,684 B1 * 7/2001 Stewart .................. H01Q 1/244
343/900

(Continued)

FOREIGN PATENT DOCUMENTS

| KR | 10-2014-0050518 A | 4/2014 |
| KR | 10-2015-0003626 A | 1/2015 |

(Continued)

OTHER PUBLICATIONS

International Search Report dated Nov. 25, 2019 issued in International Application No. PCT/KR2019/010106.

*Primary Examiner* — Bryan Earles
(74) *Attorney, Agent, or Firm* — Jefferson IP Law, LLP

(57) ABSTRACT

Disclosed is an electronic device. An electronic device according to various embodiments comprises: a housing elongated between a first end portion and a second end portion; a resonant circuit having a coil placed inside the housing; a wireless communication circuit placed inside the housing; a rectifier for rectifying, to a direct-current power, an alternating-current power which is received via the resonant circuit; a battery which is charged by using the direct-current power; a switch for selectively connecting between the rectifier and the battery; a voltage detector which is set to detect the voltage value of the direct-current power and transmit, on the basis of the detected voltage value, a control signal for turning the switch on and off to the switch and the wireless communication circuit, wherein, when an interval of time between the control signals to be (Continued)

sequentially received from the voltage detector is the same or less than a predetermined value, the wireless communication circuit can be set to ignore at least one control signal to be received additionally after the sequentially received control signals. Other various embodiments can be provided.

15 Claims, 14 Drawing Sheets

(51) Int. Cl.
  *H02J 50/12* (2016.01)
  *H02J 50/80* (2016.01)
  *H02J 50/40* (2016.01)

(52) U.S. Cl.
  CPC ...... *H02J 50/80* (2016.02); *G06F 2203/0384* (2013.01); *H02J 50/40* (2016.02)

(58) Field of Classification Search
  CPC .... G06F 1/1607; G06F 1/1626; G06F 1/1698; G06F 1/3215; G06F 1/324; G06F 1/3278; G06F 1/3287; G06F 3/04162; G06F 1/3228; G06F 3/038; H02J 50/12; H02J 50/80; H02J 50/40; H02J 7/0044; H02J 7/342
  See application file for complete search history.

(56) References Cited

U.S. PATENT DOCUMENTS

| | | | |
|---|---|---|---|
| 6,535,718 B2* | 3/2003 | Harano | H01Q 1/2258 343/702 |
| 6,650,532 B2* | 11/2003 | Shin | G06F 1/1632 439/928 |
| 6,681,333 B1* | 1/2004 | Cho | G06F 1/26 713/300 |
| 8,415,572 B2* | 4/2013 | Yang | G06F 3/03545 345/179 |
| 9,270,015 B2* | 2/2016 | Harper | H01Q 1/273 |
| 9,274,623 B2* | 3/2016 | Lee | G06F 3/0304 |
| 2007/0227785 A1 | 10/2007 | Katsurahira et al. | |
| 2008/0094292 A1* | 4/2008 | Su | H01Q 1/242 343/702 |
| 2014/0078116 A1* | 3/2014 | Mercea | G06F 3/03545 345/179 |
| 2014/0113689 A1 | 4/2014 | Lee | |
| 2015/0002425 A1 | 1/2015 | Lee et al. | |
| 2016/0141884 A1* | 5/2016 | Lee | H02J 50/40 307/104 |
| 2016/0320918 A1 | 11/2016 | Hara | |
| 2017/0371435 A1* | 12/2017 | Yamada | G06F 3/03545 |
| 2018/0011557 A1 | 1/2018 | Katsurahira et al. | |

FOREIGN PATENT DOCUMENTS

| | | |
|---|---|---|
| KR | 10-2017-0008929 A | 1/2017 |
| KR | 10-2017-0132754 A | 12/2017 |

* cited by examiner

DIGITAL PEN FOR CHARGING BATTERY AND METHOD FOR OPERATING SAME

CROSS-REFERENCE TO RELATED APPLICATION(S)

This application is a U.S. National Stage under 35 U.S.C. § 371 of an International application number PCT/KR2019/010106, filed on Aug. 9, 2019, which is based on and claims priority to Korean Patent Application No. 10-2018-0093398, which was filed on Aug. 9, 2018 in the Korean Intellectual Property Office, the disclosure of which is incorporated by reference herein in its entirety.

BACKGROUND

1. Field

Various embodiments relate to a digital pen that charges a battery included in a digital pen and a method for operating the digital pen.

2. Description of the Related Art

When a digital pen including a battery is inserted into an insertion hole of an external electronic device, into which the digital pen may be inserted to charge the digital pen, the electronic device may detect insertion of the digital pen based on electric current induced in a coil disposed in a portion of the insertion hole and, upon detection of the insertion, may apply a charging signal for driving a charging circuit for charging the battery included in the digital pen to a resonant circuit of the digital pen from the coil of the external electronic device.

Upon application of the charging signal to the coil of the external electronic device, the coil may form a magnetic field having a magnitude that changes over time based on the charging signal. An induced electromotive force based on the magnetic field may be generated in a coil of the resonant circuit of the digital pen, and the digital pen may charge the included battery by using the induced electromotive force.

SUMMARY

The charging signal applied to the resonant circuit included in the digital pen is energy having a higher voltage than a detecting signal for detecting a position of the digital pen and is continuously provided, such that a voltage detector inside the digital pen may identify whether a signal received from the external electronic device is a position detecting signal or a charging signal, based on a voltage of direct-current (DC) power received from a rectifier to turn or off a switch connected to the battery, thereby charging the battery.

For high charging efficiency, the amount of charging in a transmission (Tx) time may be greater than the amount of discharging in a reception (Rx) time of a digitizer of the external electronic device, such that a voltage of power received from the resonant circuit of the digital pen may exceed a threshold value for turning on the switch connected to the battery of the digital pen, causing the digital pen to operate incorrectly as if the digital pen is charged by being inserted into a pocket.

According to various embodiments, by setting a frequency of a signal used for position detection of the digital pen to be different from a frequency used for charging of the battery of the digital pen, charging efficiency may be reduced in spite of charging misoperation during position detection of the digital pen.

An electronic device according to various embodiments includes a housing elongated between a first end portion and a second end portion, a resonant circuit including a coil disposed in the housing, a wireless communication circuit disposed in the housing, a rectifier disposed in the housing and configured to rectify alternating-current (AC) power received through the resonant circuit to direct-current (DC) power, a voltage detector disposed in the housing and configured to measure a voltage for the DC power and transmit a control signal for changing a state of the wireless communication circuit to a control circuit based on the measured voltage, and the control circuit disposed in the housing and electrically connected to the voltage detector and the wireless communication circuit, in which the control circuit is configured to change the state of the wireless communication circuit at least partially based on a number of times a control signal is sequentially received within a specific time after reception of a first control signal from the voltage detector.

A method for controlling an electronic device according to various embodiments includes receiving alternating-current (AC) power by using a resonant circuit, rectifying the AC power received through the resonant circuit to direct-current (DC) power, by using a rectifier, measuring a voltage for direct-current (DC) power by using a voltage detector, transmitting a control signal for changing a state of a wireless communication circuit to a control circuit based on the measured voltage, and changing the state of the wireless communication circuit at least partially based on a number of times a control signal is sequentially received within a specific time after reception of a first control signal from the voltage detector. An electronic device according to various embodiments includes a housing elongated between a first end portion and a second end portion, a resonant circuit including a coil disposed in the housing, a wireless communication circuit disposed in the housing, a rectifier configured to rectify alternating-current (AC) power received through the resonant circuit to direct-current (DC) power, a battery charged using the DC power, a switch configured to selectively connect the rectifier with the battery, and a voltage detector configured to measure a voltage for the DC power and transmit a control signal for turning the switch on or off to the switch and the wireless communication circuit based on the measured voltage, in which the wireless communication circuit is configured to ignore at least one control signal to be additionally received after sequentially received control signals when a time interval between the control signals sequentially received from the voltage detector is less than or equal to a designated value.

A charging error of a digital pen may be prevented by distinguishing a period, a waveform, a frequency, etc., of a Tx signal for detecting a position of the digital pen on a display of an external electronic device from those of a Tx signal for charging the digital pen when the digital pen is inserted into an insertion hole of an external electronic device.

BRIEF DESCRIPTION THE OF DRAWINGS

DETAILED DESCRIPTION

Figure 1:
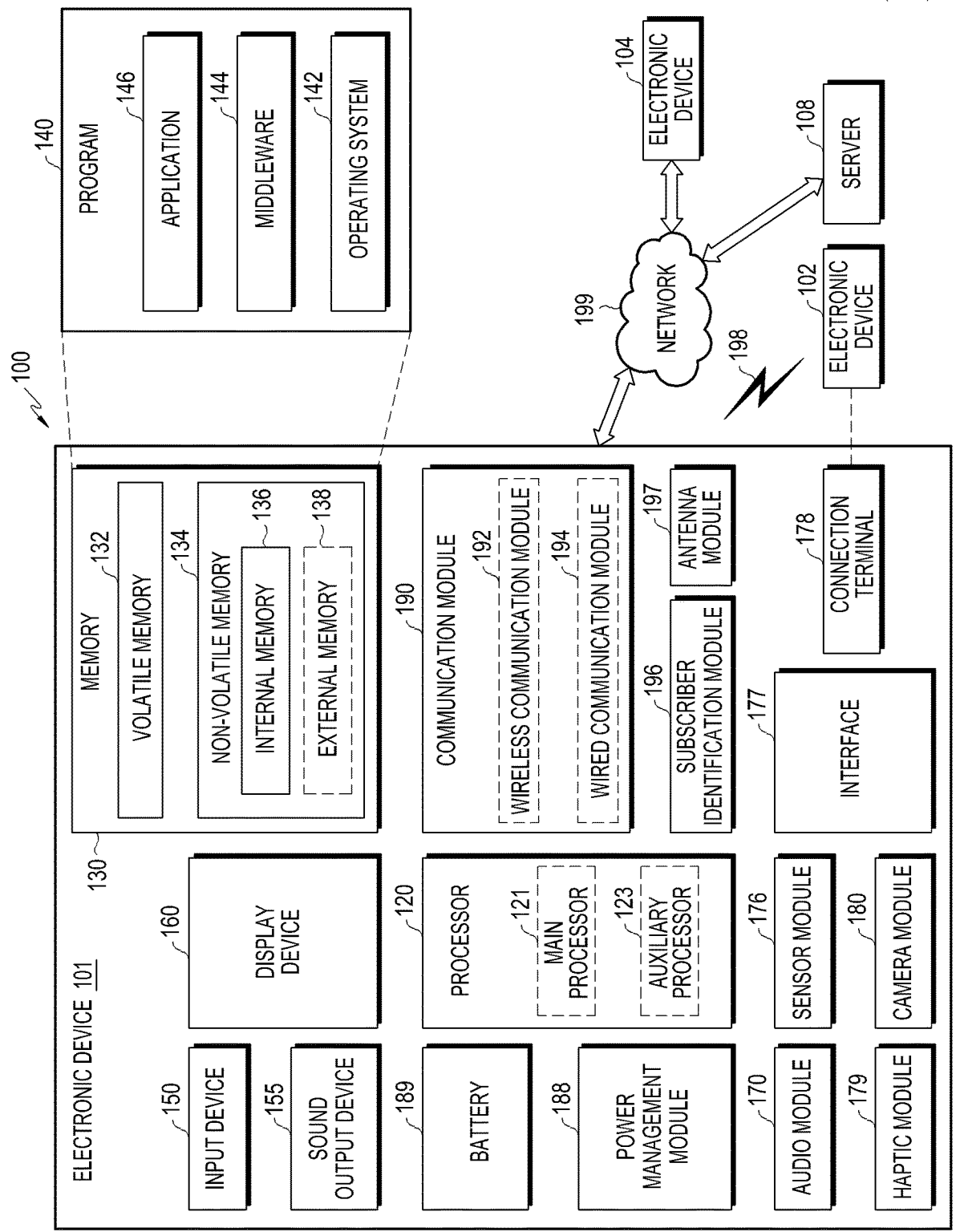
FIG. 1 illustrates a network environment including an electronic device to control image output using a transparent member based on a remaining battery capacity and an external brightness, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the present disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
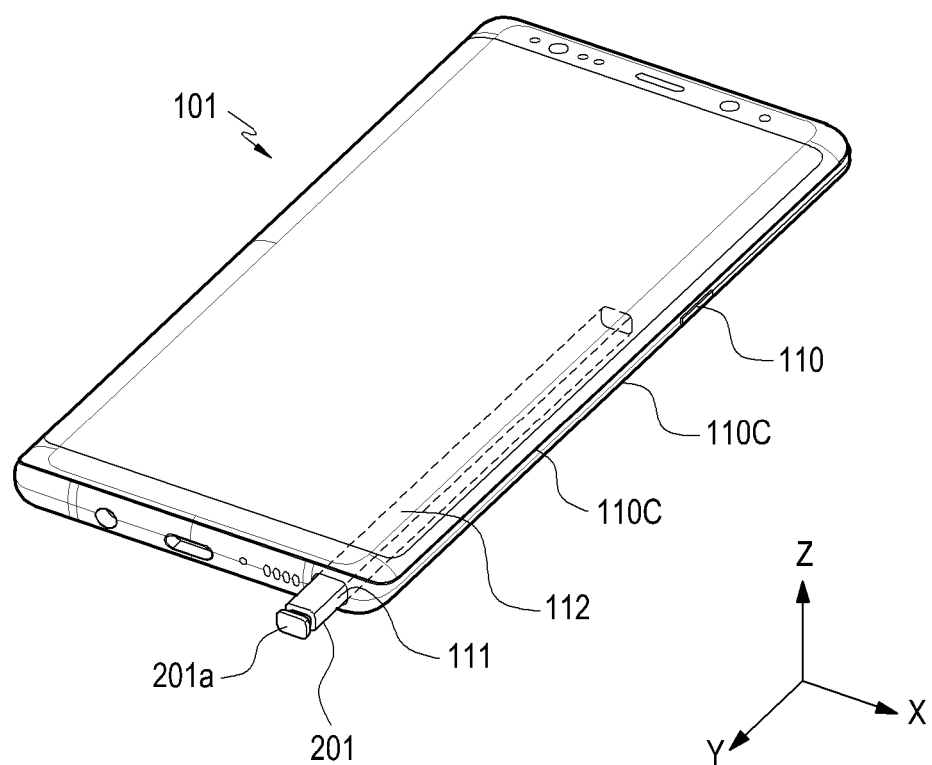
FIG. 2 is a perspective view of an electronic device including a digital pen.

Referring to FIG. 2, the electronic device 101 according to an embodiment may include components shown in FIG. 1, and may include a structure into which a digital pen 201 (e.g., a stylus pen) may be inserted. The electronic device 101 may include a housing 110, on a portion of which, e.g., a portion of a side surface 110c a hole 111 may be provided. The electronic device 101 may include an accommodating space 112 connected with the hole 111, and the digital pen 201 may be inserted into the accommodating space 112. According to the shown embodiment, the digital pen 201 may include a pressable button 201a in an end portion thereof to make it easy to take the digital pen 201 out of the accommodating space 112 of the electronic device 101. When the button 201a is pressed, repulsion mechanisms (e.g., at least one spring) configured jointly with the button 201a may operate such that the digital pen 201 may leave the accommodating space 112.

Figure 3:
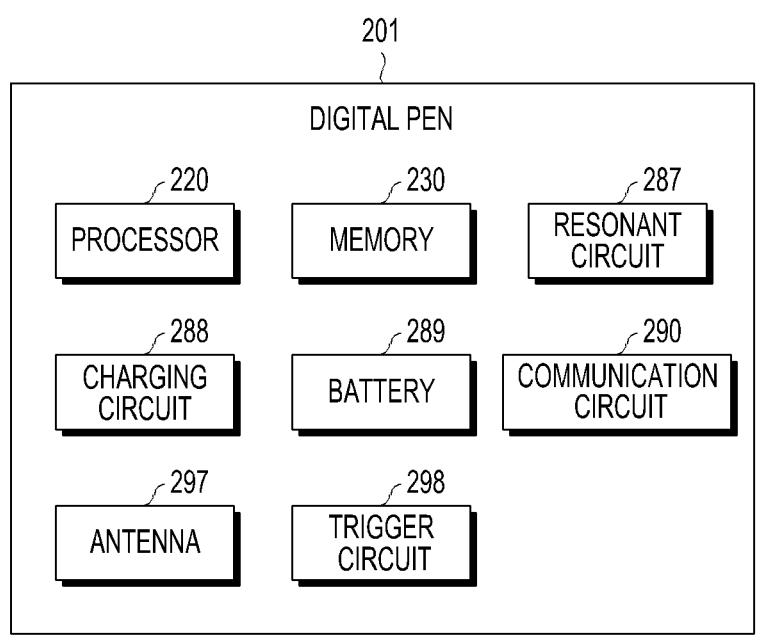
FIG. 3 is a block diagram of a digital pen according to an embodiment.

Referring to FIG. 3, the digital pen 201 according to an embodiment may include a processor 220, a memory 230, a resonant circuit 287, a charging circuit 288, a battery 289, a communication circuit 290, an antenna 297, and/or a trigger circuit 298. In some embodiments, at least a part of the processor 220 and the resonant circuit 287 of the digital pen 201 and/or at least a part of the communication circuit 290 may be configured on a printed circuit board or in the form of a chip. The processor 220, the resonant circuit 287, and/or the communication circuit 290 may be electrically connected with the memory 230, the charging circuit 288, the battery 289, the antenna 297, or the trigger circuit 298. The digital pen 201 according to an embodiment may merely include a resonant circuit and a button.

The processor 220 may include a customized hardware module or a generic processor configured to execute software (e.g., an application program). The processor may include a hardware component (function) including at least one of various sensors included in the digital pen 201, a data measurement module, an input/output interface, a module for managing a state or environment of the digital pen 201, or a communication module, or a software element (program). The processor 220 may include, for example, a combination of one or two or more of hardware, software, or firmware. According to an embodiment, the processor 220 may receive a proximity signal corresponding to an electromagnetic field signal generated from a digitizer (e.g., the display device 160) of the electronic device 101 through the resonant circuit 287. As identifying the proximity signal, the processor 220 may control the resonant circuit 287 to transmit an electromagnetic resonance (EMR) input signal to the electronic device 101.

The memory 230 may store information related to an operation of the digital pen 201. For example, the information may include information for communication with the electronic device 101 and frequency information related to an input operation of the digital pen 201.

The resonant circuit 287 may include at least one of a coil, an inductor, or a capacitor. The resonant circuit 287 may be used for the digital pen 201 to generate a signal including a resonating frequency. For example, to generate the signal, the digital pen 201 may use at least one of an EMR scheme, an active electrostatic (AES) scheme, or an electrically coupled resonance (ECR) scheme. When the digital pen 201 transmits the signal by using the EMR scheme, the digital pen 201 may generate the signal including the resonating frequency based on an electromagnetic field generated from an inductive panel of the electronic device 101. When the digital pen 201 transmits the signal by using the AES scheme, the digital pen 201 may generate the signal by using capacitive coupling with the electronic device 101. When the digital pen 201 transmits the signal by using the ECR scheme, the digital pen 201 may generate the signal including the resonating frequency based on an electric field generated from a capacitive device of the electronic device 101. According to an embodiment, the resonant circuit 287 may be used to change a strength or a frequency of an electromagnetic field depending on a user's manipulation state. For example, the resonant circuit 287 may provide a frequency for recognizing a hovering input, a drawing input, a button input, or an erasing input.

When the charging circuit 288 is connected with the resonant circuit 287 based on a switching circuit, the charging circuit 288 may rectify a resonating signal generated in the resonant circuit 287 into a direct-current (DC) signal and provide the DC signal to the battery 289. According to an embodiment, the digital pen 201 may determine whether the digital pen 201 is inserted into the electronic device 101 by using a voltage level of the DC signal detected in the charging circuit 288.

The battery 289 may be configured to store power required for an operation of the digital pen 201. The battery 289 may include, for example, a lithium-ion battery or a capacitor, and may be of a rechargeable type or a replaceable type. According to an embodiment, the battery 289 may be charged using power (e.g., a DC signal (DC power)) provided from the charging circuit 288.

The communication circuit 290 may be configured to perform a wireless communication function between the digital pen 201 and the communication module 190 of the electronic device 101. According to an embodiment, the communication circuit 290 may transmit state information and input information of the digital pen 201 to the electronic device 101 by using a short-range communication scheme. For example, the communication circuit 290 may transmit direction information (e.g., motion sensor data) of the digital pen 201 obtained through the trigger circuit 298, voice information input through a microphone, or remaining capacity information of the battery 289 to the electronic device 101. For example, the short-range communication scheme may include at least one of Bluetooth, Bluetooth Low Energy (BLE), or a wireless local area network.

The antenna 297 may be used to transmit or receive a signal or power to or from an external device (e.g., the electronic device 101). According to an embodiment, the digital pen 201 may include a plurality of antennas 297 from among which at least one antenna 297 appropriate for a communication scheme may be selected. Among the selected at least one antenna 197, the communication circuit 290 may exchange a signal or power with an external electronic device.

The trigger circuit 298 may include at least one button or sensor circuit. According to an embodiment, the processor 220 may identify an input scheme (e.g., a touch or press) or a type (e.g., an EMR button or a BLE button) of a button of the digital pen 201. According to an embodiment, the sensor circuit may generate an electrical signal or data value corresponding to an internal operating state or external environmental state of the digital pen 201. For example, the sensor circuit may include at least one of a motion sensor, a battery remaining capacity detecting sensor, a pressure sensor, an optical sensor, a temperature sensor, a geomagnetic sensor, or a biometric sensor. According to an embodiment, the trigger circuit 298 may transmit a triggering signal to the electronic device 101 by using an input signal of a button or a signal made with a sensor.

Figure 4:
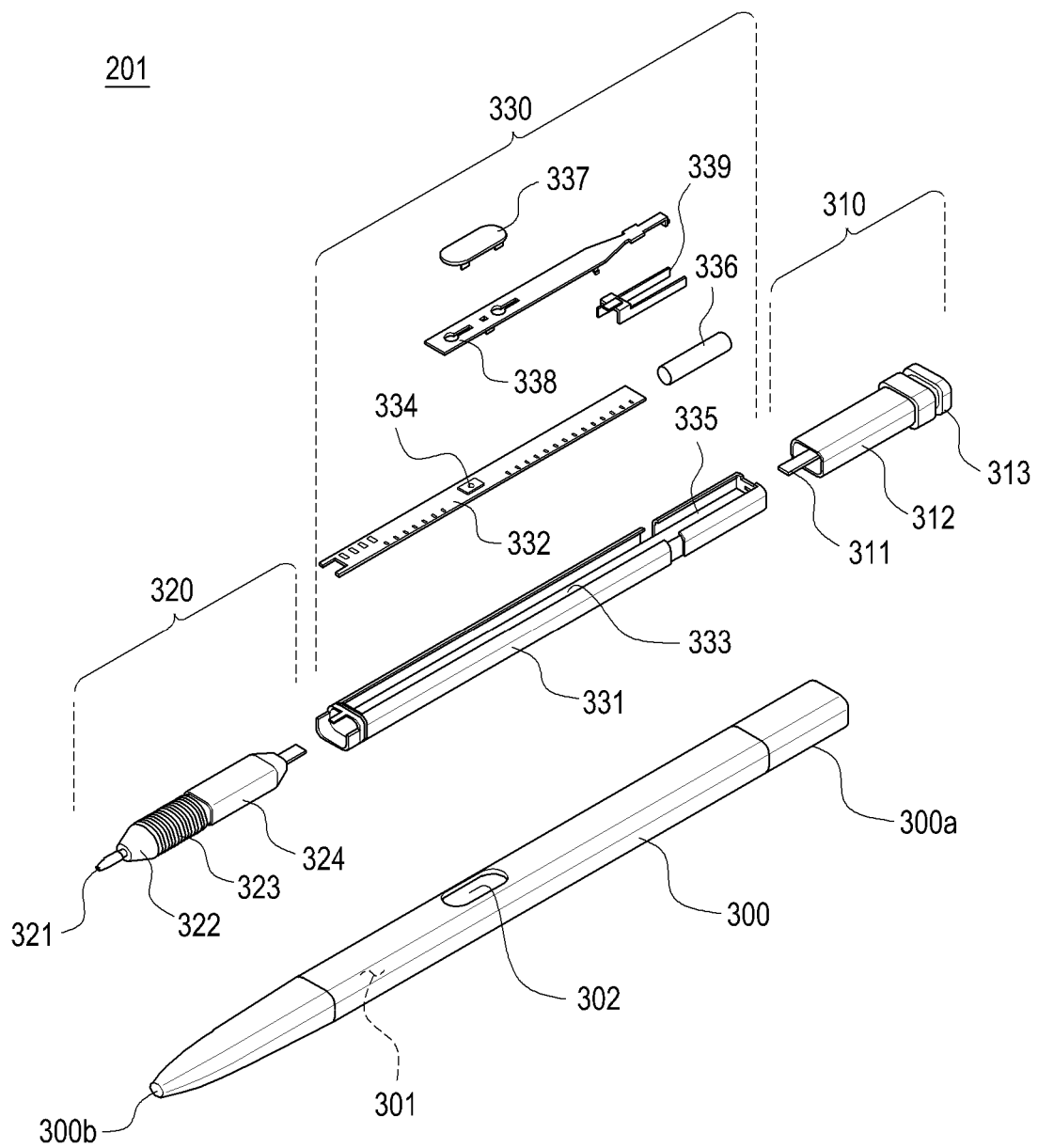
FIG. 4 is an exploded perspective view of a digital pen according to an embodiment.

Referring to FIG. 4, the digital pen 201 may include a pen housing 300 forming an appearance of the digital pen 201 and an inner assembly inside the pen housing 300. In the shown embodiment, the inner assembly may include all parts mounted in the pen and may be inserted into the pen housing 300 with a single assembly operation.

The pen housing 300 may have a shape elongated between a first end portion 300*a* and a second end portion 300*b*, and may include the accommodating space 112 therein. The pen housing 300 may have a cross section in an oval shape including a main axis and a minor axis, and may globally have a cylindroid shape. An accommodating space 301 of the electronic device 101 may also have a cross section in an oval shape to correspond to the shape of the pen housing 300. The pen housing 300 may include synthetic resin (e.g., plastic) and/or a metallic material (e.g., aluminum). According to an embodiment, the second end portion 300*b* of the pen housing 300 may be formed of a synthetic resin material.

The inner assembly may have a shape elongated to correspond to the shape of the pen housing 300. The inner assembly may roughly include three components in a longitudinal direction. For example, the inner assembly may include an ejection member 310 disposed in a position corresponding to the first end portion 300*a* of the pen housing 300, a coil portion 320 disposed in a position corresponding to the second end portion 300*b* of the pen housing 300, and a circuit board portion 330 disposed in a position corresponding to a body of the housing.

The ejection member 310 may include a component for ejecting the digital pen 201 from the accommodating space 112 of the electronic device 101. According to an embodiment, the ejection member 310 may include a shaft 311, and an ejection body 312 and a button portion 313 which are disposed on a circumference of the shaft 311 and form a global appearance of the ejection member 310. Upon complete insertion of the inner assembly into the pen housing 300, a part including the shaft 311 and the ejection body 312 may be surrounded by the first end portion 300*a* of the pen housing 300 and the button portion 313 (e.g., 201*a* of FIG. 2) may be exposed to outside the first end portion 300*a*. A plurality of components not shown, e.g., cam members or elastic members may be disposed in the ejection member 312 to form a push-pull structure. In an embodiment, the button portion 313 may be substantially coupled with the shaft 311 to linearly reciprocate with respect to the ejection member 312. According to various embodiments, the button portion 313 may include a button having a locking structure formed therein to allow a user to take out the digital pen 201 using a nail. According to an embodiment, the digital pen 201 may provide another input scheme by including a sensor for detecting linear reciprocation of the shaft 311.

The coil portion 320 may include a pen tip 321 exposed to outside the second end portion 300*b* when the inner assembly is completely inserted into the pen housing 300, a packing ring 322, a coil 323 wound a plurality of times, and/or a pen pressure detector 324 for obtaining a pressure change with respect to pressurization of the pen tip 321. The packing ring 322 may include epoxy, rubber, urethane, or silicon. The packing ring 322 may be included for a waterproof or dustproof purpose and protect the coil portion 320 and the circuit board portion 330 against water or dust. According to an embodiment, the coil 323 may form a resonating frequency in a set frequency band (e.g., 500 kHz) and may be combined with at least one element (e.g., a capacitive capacitor) to adjust the resonating frequency formed by the coil 323 within a specific range.

The circuit board portion 330 may include a printed circuit board 332, a base 331 surrounding at least a surface of the printed circuit board 332, and an antenna. According to an embodiment, a board placing portion 333 on which the printed circuit board 332 is disposed may be formed on a top surface of the base 331, and the printed circuit board 332 may be fixedly placed on the board placing portion 333. According to an embodiment, the printed circuit board 332 may include the top surface and a bottom surface, in which a variable-capacity capacitor or a switch 334 connected with the coil 323 may be disposed on the top surface and a charging circuit, a battery, or a communication circuit may be disposed on the bottom surface. The battery may include an electric double layered capacitor (EDLC). The charging circuit may be positioned between the coil 323 and the battery and may include a voltage detector circuitry and a rectifier.

The antenna may include an antenna structure 339 like an example shown in FIG. 4 and/or an antenna embedded in the printed circuit board 332. According to various embodiments, the switch 334 may be included on the printed circuit board 332. A side button 337 provided on the digital pen 201 may be used to press the switch 334, and may be exposed to outside through a side opening 302 of the pen housing 300. The side button 337 may be supported by a support member 338, and in case of absence of an external force applied to the side button 337, the support member 338 may provide an elastic restoring force to restore or maintain the side button 337 to or in a state of being disposed at a particular position.

The circuit board portion 330 may include another packing ring like an O-ring. For example, an O-ring formed of an elastic body may be disposed in both ends of the base 331 to form a sealing structure between the base 331 and the pen housing 300. In some embodiment, the support member 338 may form a sealing structure closely to an inner wall of the pen housing 300 partially around the side opening 302. For example, in the circuit board portion 330, a waterproof and dustproof structure similar to the packing ring 322 of the coil portion 320 may be formed.

The digital pen 201 may include a battery placing portion 335 on which the battery 336 is disposed, on the top surface of the base 331. The battery 336 that may be placed on the battery placing portion 335 may include, for example, a cylinder type battery.

The digital pen 201 may include a microphone (not shown). The microphone may be directly connected to the printed circuit board 332, or may be connected to a separate flexible printed circuit board (FPCB, not shown) connected with the printed circuit board 332. According to various embodiments, the microphone may be disposed in a position parallel with the side button 337 in a longitudinal direction of the digital pen 201.

Figure 5A:
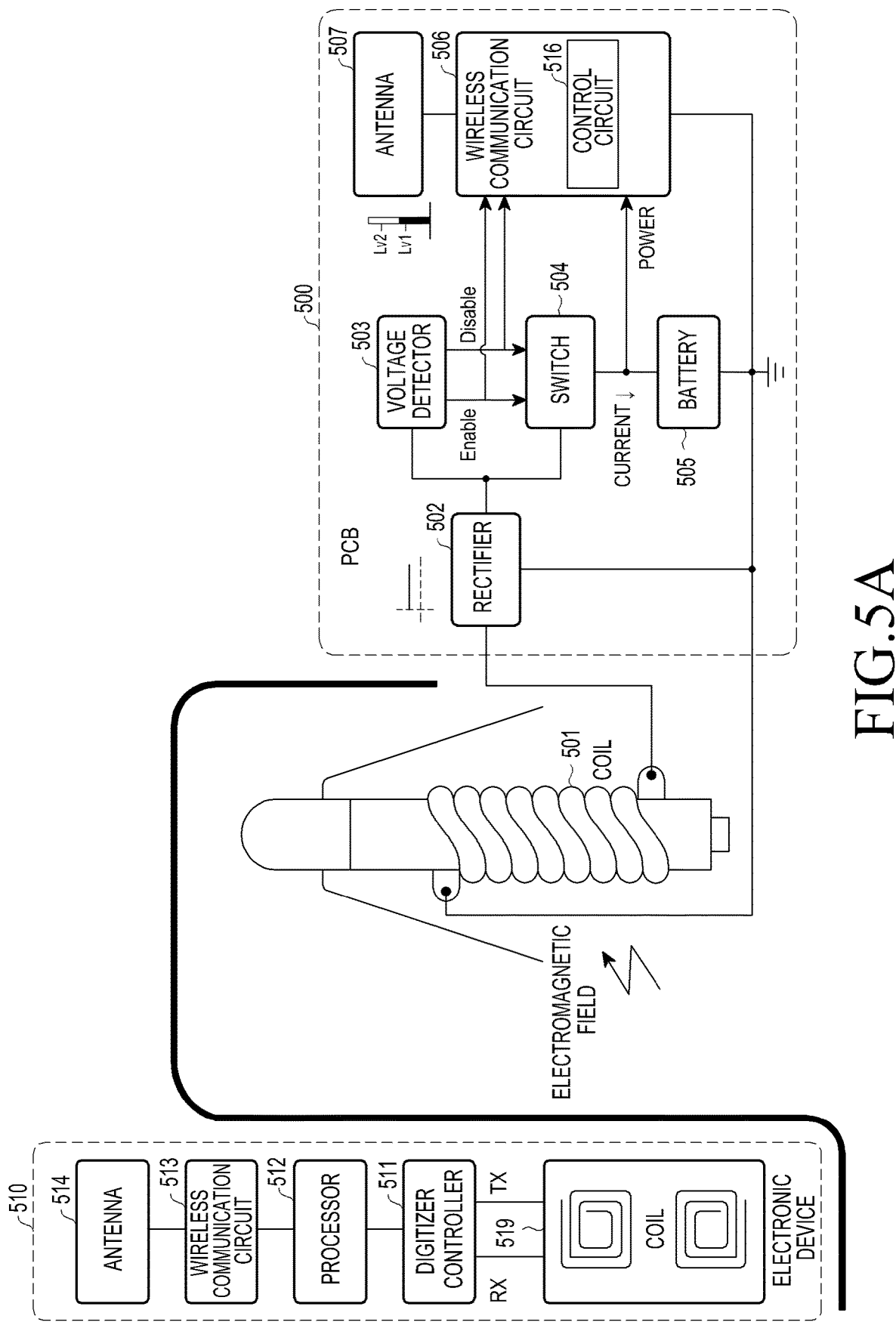
FIG. 5A is an exemplary view showing a structure of a digital pen and an external electronic device according to an embodiment.
Figure 5B:
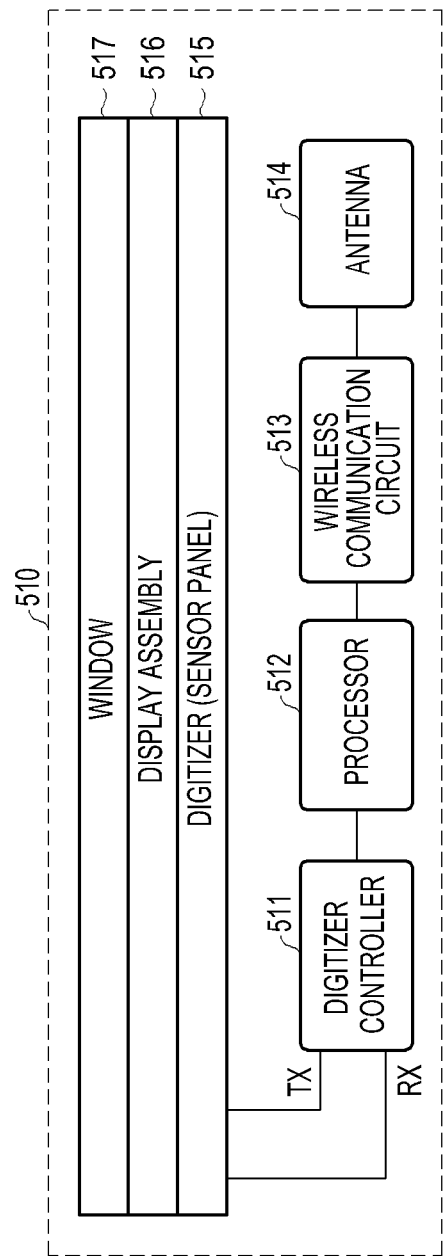
FIG. 5B is an exemplary view showing a structure of a digital pen and an external electronic device according to an embodiment.
Figure 6A:
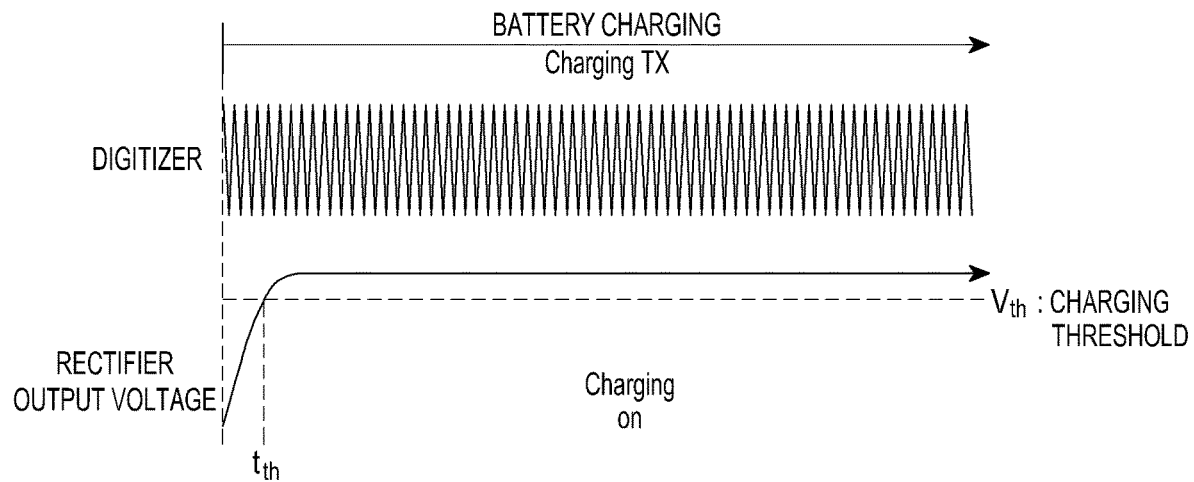
FIG. 6A is a graph for describing a structure in which a battery of a digital pen is charged, according to an embodiment.
Figure 6B:
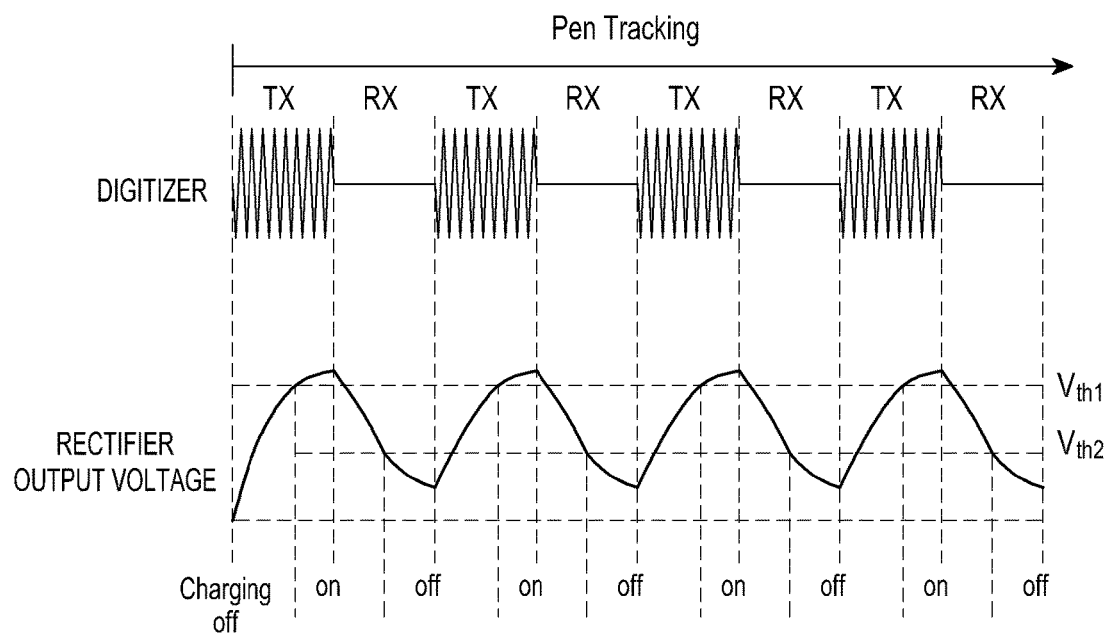
FIG. 6B is a graph for describing a structure in which detection of a digital pen is performed, according to an embodiment.

FIG. 5A is an exemplary view showing a structure of a digital pen and an external electronic device according to an embodiment. FIG. 5B is an exemplary view showing a structure of a digital pen and an external electronic device according to an embodiment. FIG. 6A is a graph for describing a structure in which a battery of a digital pen is charged, according to an embodiment. FIG. 6B is a graph for describing a structure in which detection of a digital pen is performed, according to an embodiment.

Referring to FIG. 5A, a digital pen 500 (e.g., the digital pen 201 of FIG. 2) may include a resonant circuit 501, a rectifier 502, a voltage detector 503, a switch 504, a battery 505, a wireless communication circuit 506, and/or an antenna 507. An external electronic device 510 (e.g., the electronic device 101 of FIG. 1) may include a coil 519 for detecting insertion of the digital pen 500, a digitizer controller 511, a processor 512 (e.g., the processor 120 of FIG. 1), a wireless communication circuit 513 (e.g., the communication module 190 of FIG. 1), and an antenna 514 (e.g., the antenna module 197 of FIG. 1). Alternatively, referring to FIG. 5B, the external electronic device 510 (e.g., the electronic device 101 of FIG. 1) may include the digitizer controller 511, the processor 512 (e.g., the processor 120 of FIG. 1), the wireless communication circuit 513 (e.g., the communication module 190 of FIG. 1), the antenna 514 (e.g., the antenna module 197 of FIG. 1), a digitizer 515, a display assembly 516, and/or a window 517. The resonant circuit 501 may detect an electromagnetic signal applied from the external electronic device 510 and output a signal of a particular frequency to the rectifier 502. For example, the resonant circuit 501 may generate resonance based on an electromagnetic field, thus outputting an electrical signal.

When the digital pen 500 (e.g., the digital pen 201 of FIG. 2) is board inserted into an insertion hole of the external electronic device 510 into which the digital pen 500 may be inserted, to charge the battery 289 of the digital pen 500, the coil 519 disposed in a portion of the insertion hole of the external electronic device may detect whether the digital pen 500 is inserted into the insertion hole. For example, upon application of the electrical signal to the coil 519, a response to the electromagnetic field generated by the electrical signal may be generated by the resonant circuit 501, and the processor 512 may determine whether the digital pen 500 is inserted, by identifying the response, without a limitation to an identification method. After detection of insertion of the digital pen 500, the external electronic device 510 may charge the battery 289 of the digital pen 500 by applying a signal for charging the battery 289 included in the digital pen 500 to the resonant circuit 501 through the coil 519.

To detect insertion of the digital pen 500 into the insertion hole, the digitizer controller 511 may apply a transmission (Tx) signal through the coil 519 at specific time intervals. In transmission of a Tx signal from the digitizer controller 511 through the coil 519, when the coil 519 of the external electronic device 510 and the resonant circuit 501 of the digital pen 500 are disposed adjacent to each other, an electromagnetic field may be generated between the coil 519 and the resonant circuit 501, such that induced current may be generated in the resonant circuit 501 and accumulated in a resonating tank of the resonant circuit 501. When transmission of the Tx signal from the digitizer controller 511 is stopped, energy stored in the resonating tank included in the resonant circuit 501 of the digital pen 500 may flow to the coil of the resonant circuit 501 to generate an electromagnetic field and current may be induced or a signal may be received in the coil 519. The processor 512 of the external electronic device 510 may detect a strength of the induced current or the received signal through the digitizer controller 511 to determine whether the digital pen 500 is inserted into the insertion hole of the external electronic device. The digitizer controller 511 may transmit a charging signal to the resonant circuit 501 through the coil 519 based on insertion or non-insertion of the digital pen 500.

The rectifier 502 may convert alternating-current (AC) power received through the resonant circuit 501 into direct-current (DC) power and transmit the DC power to the voltage detector 503 and the switch 504. The voltage detector 503 may determine, based on a DC voltage transmitted from the rectifier 502, whether a signal applied to the resonant circuit 501 by the external electronic device 510 is a detecting signal for detecting a position of the digital pen 500 or a charging signal for charging the battery 505 of the digital pen 500. For example, a voltage of the rectified charging signal and a voltage of the rectified detecting signal may be different from each other. The voltage detector 503 may compare the voltage of the rectified power with at least one preset threshold voltage and output any one of an enable signal for controlling the switch 504 to be in an on state and a disable signal for controlling the switch 504 to be in an off state to the switch 504 based on a comparison result. For example, the at least one threshold voltage may be set such that the enable signal is output when power input to the switch 504 is power that rectifies the charging signal, and the disable signal is output when the power input to the switch 504 is power that rectifies the detecting signal.

Referring to FIG. 6A, the charging signal applied to the coil 519 through the digitizer controller 511 may form induced current in the resonant circuit 501 of the digital pen 500 and the formed induced current may be continuously provided during a specific time as energy having a higher voltage than the detecting signal. The energy may be rectified as DC current through the rectifier 502 electrically connected with the resonant circuit 501. The DC current rectified by the rectifier 502 may be transmitted to the voltage detector 503 connected with the rectifier 502, and as a voltage (e.g., $V_{th}$ of FIG. 6A and $V_{th1}$ of FIG. 7B) greater than or equal to a threshold value is measured, the voltage detector 503 may control the switch 504 to be in the on state from a time $t_{th}$ at which the voltage greater than or equal to the threshold value is detected, thereby charging the battery 505 of the digital pen 500.

FIG. 6B is a graph for describing a structure in which detection of a digital pen is performed, according to an embodiment. A magnitude of induced current induced in the resonant circuit 501 of the digital pen 500 may be determined according to a strength of current flowing in the coil 519 and a mutual inductance between the coil 519 and the resonant circuit 501 of the digital pen 500. The mutual inductance may be determined according to a form of the coil 519, an inductance of the resonant circuit 501, a distance between the coil 519 and the resonant circuit 501, a direction thereof, etc. As induced current induced in the resonant circuit 501 increases under an influence of the mutual inductance due to at least one of a position, a gradient, or a direction of the digital pen 500 on the display 160 of the external electronic device 510, a signal having a voltage greater than a first threshold voltage $V_{th1}$ may be received with respect to an output voltage of the rectifier 502 during transmission of the Tx signal and a signal having a voltage greater than a second threshold voltage $V_{th2}$ may be received with respect to the output voltage of the rectifier 502 during reception of the Rx signal, thus repeatedly performing a charging/discharging operation. As a voltage (e.g., $V_{th}$ of FIG. 6A and $V_{th1}$ of FIG. 7B) greater than or equal to a threshold value is measured based on power received from the rectifier 502, the voltage detector 503 may control the switch 504 to be in the on state from a time at which the voltage greater than or equal to the threshold value is detected or may control the switch 504 to be in the off state in response to a signal having a voltage (e.g., $V_{th2}$ of FIG. 7B) less than or equal to the threshold value. When the switch 504 is turned on, the voltage detector 503, the rectifier 502, and the battery 505 may be connected in terms of a circuit to deliver the energy to the battery 505 for charging of the battery 505. When the voltage of the power received from the rectifier 502 exceeds $V_{th1}$, the voltage detector 503 may apply a signal for enabling the wireless communication circuit 506 of the digital pen 500 and turning on the switch 504 to charge the battery 505. Alternatively, when the voltage of the power received from the rectifier 502 exceeds $V_{th2}$, the voltage detector 503 may apply a signal for disabling the wireless communication circuit 506 and turning off the switch 504 to accurately perform position detection of the digital pen 500. The wireless communication circuit 506 of the digital pen 500 may perform wireless communication with the wireless communication circuit 513 of the external electronic device 510. Wireless communication may be wireless communication using Bluetooth. The wireless communication circuit 506 of the digital pen 500 may include the control circuit 516. The control circuit 516 may receive a control signal for enabling or disabling the wireless communication circuit 506 from the voltage detector 503 to enable or disable the wireless communication circuit 506. Unlike in FIG. 5, the control circuit 516 may be disposed inside the voltage detector 503. The control circuit 516 may generate the control signal for enabling or disabling the wireless communication circuit 506 based on a voltage of DC power received from the rectifier 502 and transmit the control signal to the wireless communication circuit 506. Referring to FIG. 5B, when the user performs input onto the window 517 of the external electronic device by using the digital pen 500, the digitizer controller 511 may calculate an input position of input of the digital pen 500 applied onto the window 517 by sequentially performing an operation of transmitting the Tx signal to the digitizer 515 and an operation of receiving the Rx signal from the digitizer 515, at specific time intervals, alternately. The Tx signal applied through the digitizer may be stored in the resonating tank in the resonant circuit 501 of the digital pen 500, and the energy stored in the resonating tank may be charged during an Rx time of the digitizer 515. Thus, the Rx signal may be applied to the digitizer 515, and the processor 512 may identify the position of the digital pen 500 based on a magnitude of each of Rx signals respectively received from a plurality of coils (e.g., channels) included in the digitizer 515. For example, for a signal detected by the processor 512 in the insertion hole of the external electronic device 510, a Tx time may be maintained long, and for a signal for scanning and detecting the digital pen 500 on the display 160, a Tx time may not be maintained long due to alternate Tx and Rx.

Figure 7A:
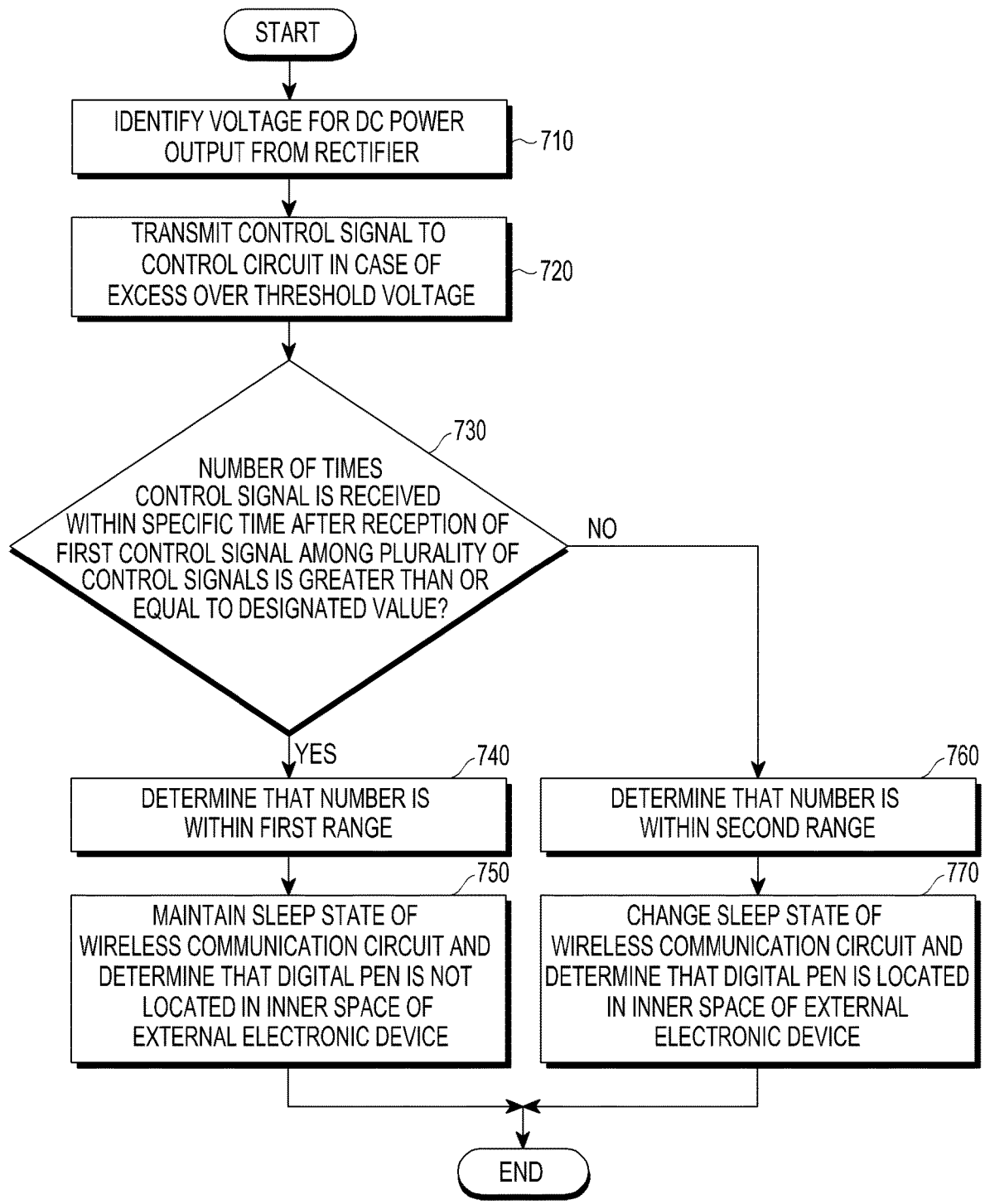
FIG. 7A is an exemplary flowchart for a structure in which a digital pen changes a state of a wireless communication circuit based on a voltage with respect to direct-current (DC) power, according to an embodiment.
Figure 7B:
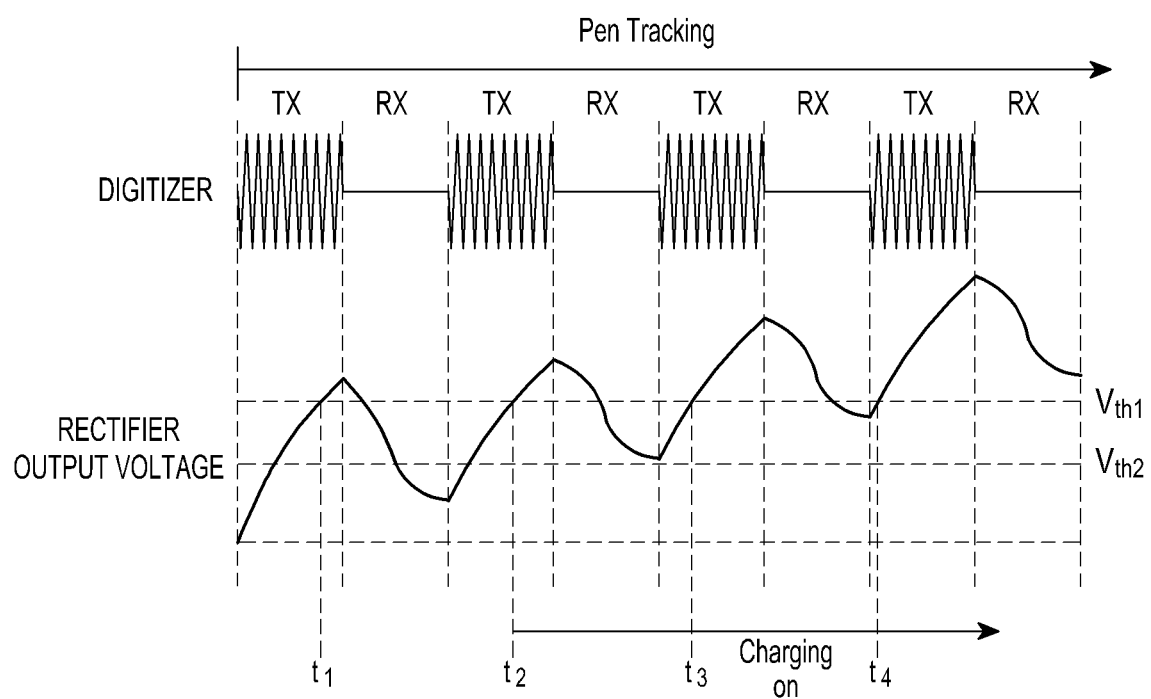
FIG. 7B is an exemplary graph for describing a structure in which a charging misoperation of a digital pen occurs, according to an embodiment.

FIG. 7A is an exemplary flowchart for a structure in which a digital pen changes a state of a wireless communication circuit based on a voltage with respect to DC power, according to an embodiment. FIG. 7B is an exemplary graph for describing a structure in which a charging misoperation of a digital pen occurs, according to an embodiment. In operation 710, a control circuit (e.g., the processor 220 of FIG. 3 or the control circuit 516 of FIG. 5) of a digital pen (e.g., the digital pen 201 of FIG. 2 or the digital pen 500 of FIG. 5) may identify a voltage for DC power output from a rectifier (e.g., the rectifier 502 of FIG. 5). In operation 720, the voltage detector 503 may transmit a control signal to the control circuit 516 when the voltage for the DC power exceeds a threshold voltage. The rectifier 502 may convert AC power received from the resonant circuit (e.g., the resonant circuit 501 of FIG. 5) into DC power and transmit the DC power to the control circuit 516, such that the control circuit 516 may identify the voltage for the DC power.

Referring to FIG. 7B, due to the induced current applied to the resonant circuit 501, a magnitude of a voltage for output power of the rectifier 516 may be determined according to a strength of current flowing in a coil (e.g., the coil 519 of FIG. 5) of the digitizer 515 and a mutual inductance between the coil 519 and the resonant circuit 501 of the digital pen 500. The mutual inductance may be determined according to the form of the coil 519, the inductance of the resonant circuit 501, a distance between the coil 519 and an inductor of the digital pen 500, a direction thereof, etc. When the digitizer outputs a Tx signal, the magnitude of the voltage increases, and when the digitizer stops outputting the Tx signal to receive the Rx signal, the magnitude of voltage may decrease.

When the digital pen 500 is not inserted into the external electronic device 510, the induced current induced in the resonant circuit 501 may increase under an influence of a mutual inductance due to a position, a gradient, directions, etc., of the digital pen 500 on a display (e.g., the display 160 of FIG. 1) of the external electronic device 510, such that a signal having a voltage greater than $V_{th1}$ may be received when the digitizer outputs a Tx signal, and a signal having a voltage less than $V_{th2}$ may be received when the digitizer receives an Rx signal, thus repeatedly performing charging/discharging. As shown in FIG. 6A, for a charging signal received in the resonant circuit during insertion into the external electronic device 510, a Tx time may be maintained long, whereas, as shown in FIG. 7B, for a signal for scanning and tracking the digital pen 500, received in the resonant circuit due to a mutual inductance, in case of non-insertion into the external electronic device 510, the Tx time may not be maintained long due to alternate Tx and Rx.

As shown in FIG. 7B, when the position of the digital pen 500 is detected and the battery 289 of the digital pen 500 is charged on the display 160, the charging signal received in the digital pen 500 may repeat turning-on/off of the switch 504 connected to the battery 289, such that charging efficiency may be poor and the wireless communication circuit 506 may be periodically activated the wireless communication circuit 506, causing unnecessary battery consumption.

Referring to FIG. 7B, when the charging efficiency is relatively high according to the position and posture of the digital pen 201, the amount of discharging in the Rx time of the digitizer 515 of the external electronic device 510 may be greater than the amount of charging in the Tx time. In this case, a voltage for DC power may exceed a threshold value $V_{th1}$ for turning off the switch 504, and when the switch 504 is turned off, the digital pen 500 may misoperate as if the digital pen 500 is inserted into the external electronic device 510 and is charged. For example, when the voltage exceeds $V_{th1}$ in a state where the digital pen 500 is not inserted into the external electronic device 510, the control circuit 516 may receive a control signal output from the voltage detector 503, thus unnecessarily activating the wireless communication circuit 506.

In operation 730, the control circuit 516 may determine whether the number of times a plurality of control signals are received within a specific time after reception of a first control signal among a plurality of control signals received sequentially is greater than or equal to a designated value. For example, when Tx and Rx are repeated a specific number of times, the control circuit 516 may sequentially receive the plurality of control signals. The control circuit 516 may determine whether the number of times a control signal is received within a specific time after a first control signal received first at $t_1$ among a plurality of control signals, which have a voltage exceeding $V_{th1}$ and are sequentially received at $t_1$, $t_2$, $t_3$, and $t_4$, is greater than or equal to a designated value. The specific time and $V_{th1}$ may be values that are set at random by the user, and do not limit the scope of the disclosure. The voltage detector 502 may transmit a control signal to the control circuit 516 when the voltage exceeds $V_{th1}$, and transmit a signal for turning on the switch 504 to the switch 504.

In operation 740, when the number of times the voltage exceeds a threshold voltage is greater than or equal to a designated value, the control circuit 516 may determine that the number is within a first range. In operation 750, when the number of times the voltage exceeds the threshold voltage is within the first range, the control circuit 516 may maintain a sleep state of the wireless communication circuit and determine that the digital pen 500 is not located in an inner space of the external electronic device 510. For example, referring to FIG. 7B, when the number of times the voltage exceeds the threshold voltage $V_{th1}$ within a specific time after $t_1$ is greater than or equal to the designated value, the control circuit 516 may determine that the digital pen 500 is not located inside the external electronic device 510. When the number is within the first range, the sleep state of the wireless communication circuit 506 may be maintained without turning on the switch even when the voltage exceeds $V_{th1}$ at $t_2$, $t_3$, and $t_4$ after $t_1$, thus not changing the sleep state of the wireless communication circuit 506 into a wake-up state. When the control signal is received in the control circuit 516 in a state where the digital pen 500 is not located in the inner space of the external electronic device 510, the control signal for charging the battery 505 from the voltage detector 502 may be ignored, thus preventing charging misoperation.

In operation 760, when the number of times the voltage exceeds the threshold voltage is less than the designated value, the control circuit 516 may determine that the number is within a second range. In operation 770, the control circuit 516 may change the sleep state of the wireless communication circuit 506 into the wake-up state and determine that the digital pen 500 is located in the inner space of the external electronic device 510. For example, unlike in FIG. 7B, when the number of times the voltage exceeds the threshold voltage $V_{th1}$ within a specific time period in which Tx and Rx are repeated is less than the designated value, the control circuit 516 may determine that the number is within the second range. For the number within the second range, when the voltage for the DC power exceeds $V_{th1}$ at a time at which the control signal is additionally received, the control circuit 516 may activate the wireless communication circuit 506, thus changing the sleep state of the wireless communication circuit 506 into the wake-up state. As the wireless communication circuit 506 changes from the sleep state into the wake-up state, the switch 504 may be turned on by a signal from the voltage detector 503 and the digital pen 500 may charge the battery 505 by performing wireless communication with the wireless communication circuit 513 of the external electronic device 510 by using the antenna 507.

Figure 8A:
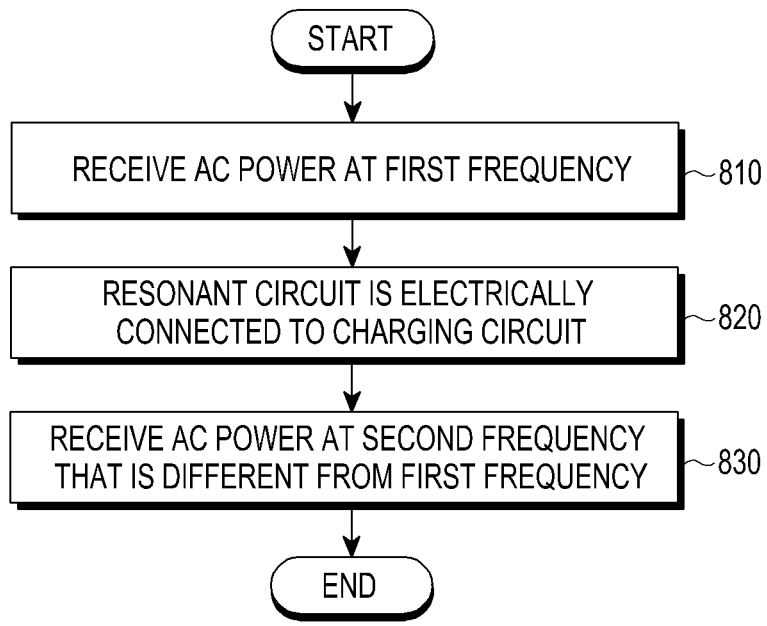
FIG. 8A is an exemplary flowchart for a structure in which a digital pen receives a voltage at a first frequency or a second frequency, according to an embodiment.
Figure 8B:
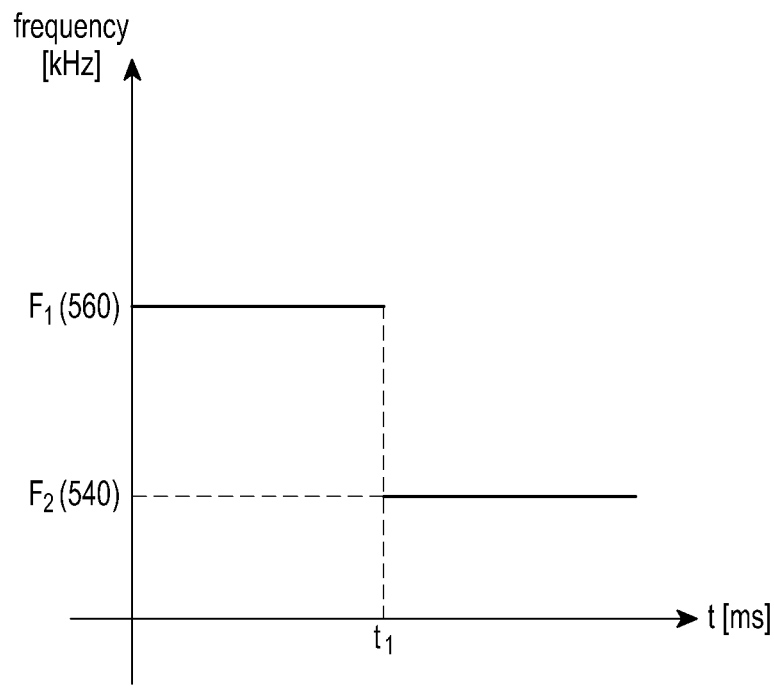
FIG. 8B is an exemplary graph for a structure in which a digital pen receives a voltage at a first frequency or a second frequency, according to an embodiment.
Figure 8C:
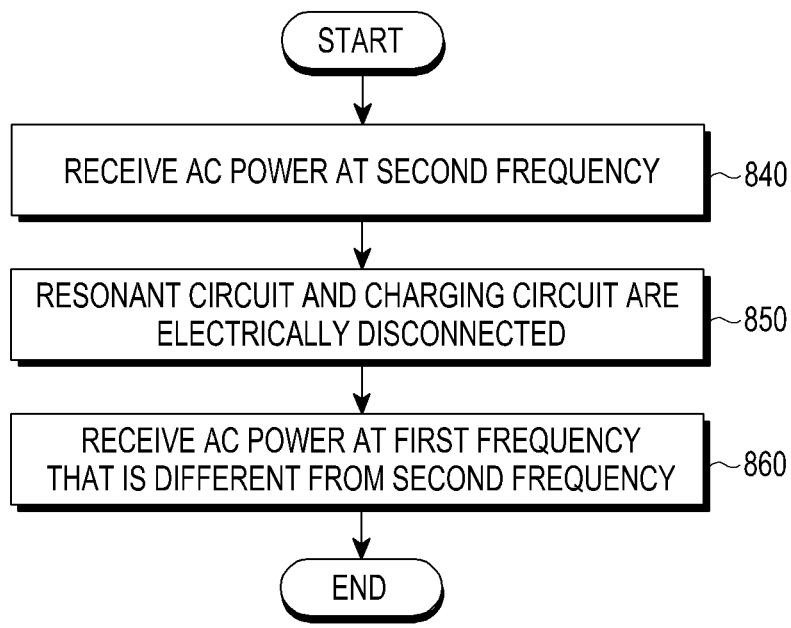
FIG. 8C is an exemplary flowchart for a structure in which a digital pen receives a voltage at a first frequency or a second frequency, according to an embodiment.
Figure 8D:
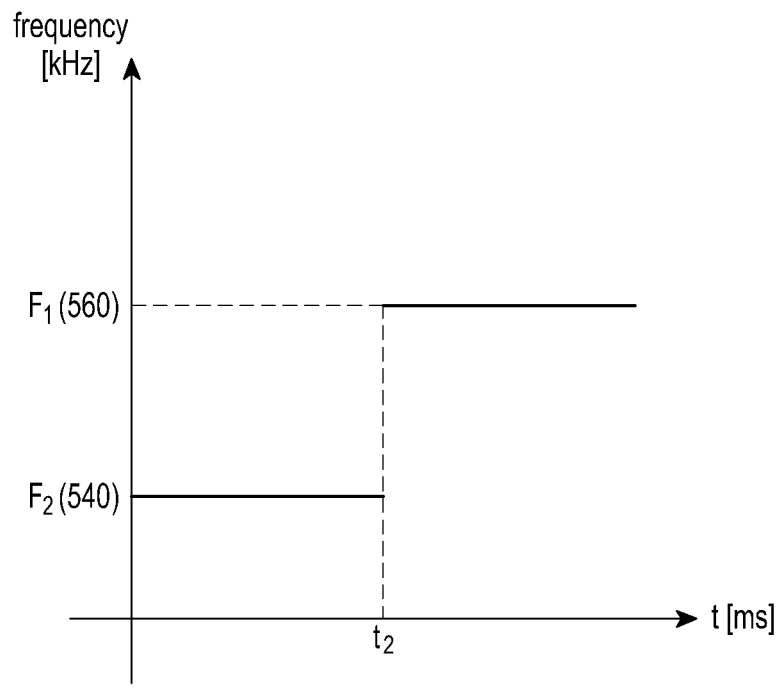
FIG. 8D is an exemplary graph for a structure in which a digital pen receives a voltage at a first frequency or a second frequency, according to an embodiment.
Figure 8E:
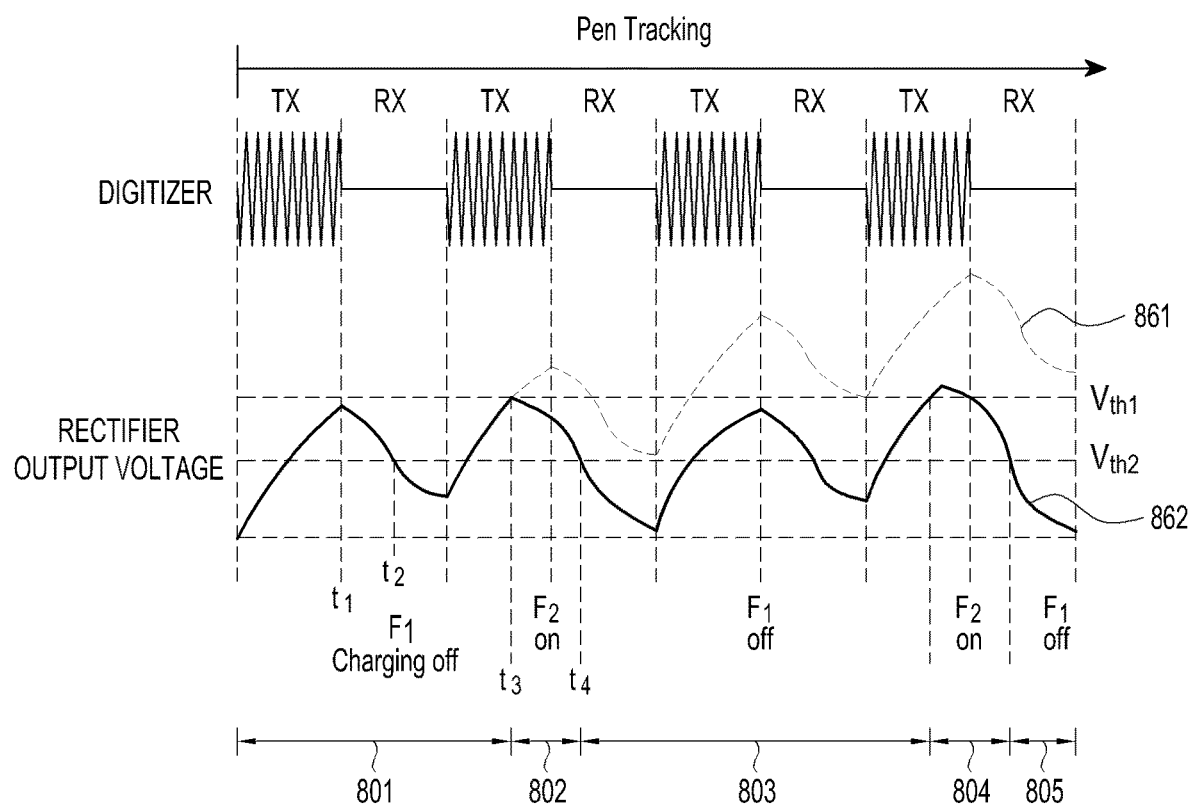
FIG. 8E shows a change of a voltage with respect to output power of a rectifier when a digital pen receives alternating-current (AC) power by changing a first frequency and a second frequency.

FIG. 8A is an exemplary flowchart for a structure in which a digital pen receives a voltage at a first frequency or a second frequency, according to an embodiment. FIG. 8B is an exemplary graph for a structure in which a digital pen receives a voltage at a first frequency or a second frequency, according to an embodiment. FIG. 8C is an exemplary flowchart for a structure in which a digital pen receives a voltage at a first frequency or a second frequency, according to an embodiment. FIG. 8D is an exemplary graph for a structure in which a digital pen receives a voltage at a first frequency or a second frequency, according to an embodiment. FIG. 8E shows a change of a voltage with respect to output power of a rectifier when a digital pen receives AC power by changing a first frequency and a second frequency.

Referring to FIGS. 8A and 8B, a control circuit (e.g., the processor 220 of FIG. 2 or the control circuit 516 of FIG. 5) may set the first threshold $V_{th1}$ and the second threshold $V_{th2}$ for a voltage with respect to output power of a rectifier (e.g., the rectifier 502 of FIG. 5) of a digital pen (e.g., the digital pen 201 of FIG. 2 or the digital pen 500 of FIG. 5) when the digital pen 500 is located outside the external electronic device 510. Alternatively, the control circuit 516 may set a resonating frequency of the resonant circuit 501 to a first frequency $F_1$ and set a resonating frequency to be changed to a second frequency $F_2$ when the switch 504 is turned on and thus the battery 505 or a separately disposed capacitor is connected to the resonant circuit 501. For example, the first frequency may be set to 560 kHz and the second frequency may be set to 540 kHz, but the scope of the disclosure may not be limited to these values and may be set variously. The first frequency $F_1$ may be a resonating frequency in a state where a charging circuit such as the battery 505, etc., is not connected to the resonant circuit 501, and may be a frequency that is appropriate for scanning the external electronic device 510 and the digital pen 500, and the second frequency $F_2$ may be a resonating frequency in a state where the charging circuit such as the battery 505, etc., is connected to the resonant circuit 501, and may be a frequency that is appropriate for charging the battery 505 of the digital pen 500 based on a charging signal received from the external electronic device 510.

In operation 810, the digital pen 500 may receive AC power at the first frequency through the resonant circuit. In operation 820, the resonant circuit 501 may be electrically connected to the charging circuit. Taking an example shown in FIG. 8E, for high charging efficiency according to a position and a posture between the digitizer 515 and the digital pen 500 on the display, even when the digital pen 500 is not located within the external electronic device 510, the amount of discharging in an Rx period may be greater than the amount of charging in the resonating tank of the resonant circuit 501 in a Tx period, such that the voltage for the output DC voltage of the rectifier may be maintained greater than $V_{th1}$ for turning on the switch 504, thus continuously charging the battery. To prevent this, a scanning frequency used to scan the digital pen 500 in the digitizer 515 of the external electronic device 510 may be designed close to the first frequency $F_1$. As a resonating frequency of the resonant circuit 501, the first frequency $F_1$ may be changed into the second frequency $F_2$ when the switch 504 is turned on and thus the charging circuit including at least one of the battery 505 or a separately disposed capacitor is connected to the resonant circuit 501. For example, the first frequency may be set to 560 kHz and the second frequency may be set to 540 kHz. In operation 830, the resonant circuit 830 may receive AC power at the second frequency that is different from the first frequency. At $t_1$ of FIG. 8B, when the voltage for DC power exceeds $V_{th1}$ at $t_1$ and thus the switch is turned on, the first frequency $F_1$ of the resonant circuit 501 may be changed to the second frequency $F_2$ at which the battery 505 of the digital pen 500 may be charged. When the digital pen 500 is not located inside the external electronic device 510, charging efficiency may be degraded due to a difference between the first frequency $F_1$, which is a scanning frequency used to scan the digital pen 500 in the digitizer 515, and the second frequency $F_2$, hindering the battery 505 of the digital pen 500 from being continuously charged on the display.

Referring to FIGS. 8C and 8D, in operation 840, the digital pen 500 may receive AC power at the second frequency through the resonant circuit. In operation 850, the resonant circuit 501 may be electrically connected to the charging circuit of the external electronic device 510. In operation 860, the resonant circuit 860 may receive AC power at the first frequency that is different from the second frequency. When the first frequency is changed to the second frequency in a state where the digital pen 500 is not inserted into the external electronic device 510, the charging efficiency may be degraded due to the difference between the scanning frequency of the external electronic device 510, the first frequency, and the second frequency of the resonant circuit 501, a voltage for DC power may be reduced to $V_{th2}$ or less. When the voltage is reduced to $V_{th2}$ or less at the time $t_2$, the resonating frequency of the resonant circuit 501 electrically disconnected to a battery (or a separate capacitor) due to turning off of the switch 504 may increase from 540 kHz to 560 kHz and the position of the digital pen 500 may be accurately detected.

FIG. 8E shows a change of a voltage with respect to output power of a rectifier when the digital pen 500 receives AC power by changing the first frequency and the second frequency. In a first period 801 where the voltage does not exceed $V_{th1}$, AC power may be received at the first frequency and the battery 505 of the digital pen 500 may not be charged. In a second period 802 where the voltage is reduced to $V_{th2}$ or less from a time at which the voltage exceeds $V_{th1}$, the frequency may be changed to the second frequency from the time at which the voltage exceeds $V_{th1}$, to receive AC power and thus charging the battery 505. As described with reference to FIGS. 8B through 8D, charging and discharging may be alternately performed, such that in the first period 801, a third period 803, and a fifth period 805, charging of the battery 505 may not be performed, and in the second period 802 and a fourth period 804, charging of the battery 505 may be performed. When the digital pen 500 receives AC power without a frequency change, charging efficiency may be improved according to a position, a posture, etc., of the digital pen 500 as shown in a first graph 861 and thus a voltage of DC power may continuously increase, such that charging may be continuously performed even in a state where the digital pen 500 is not inserted into the external electronic device 510. However, when the digital pen 500 receives AC power while performing frequency change, the AC power may have a lower voltage than in the first graph 861 as shown in a second graph 862 to degrade the charging efficiency, thus preventing unnecessary charging.

Figure 9A:
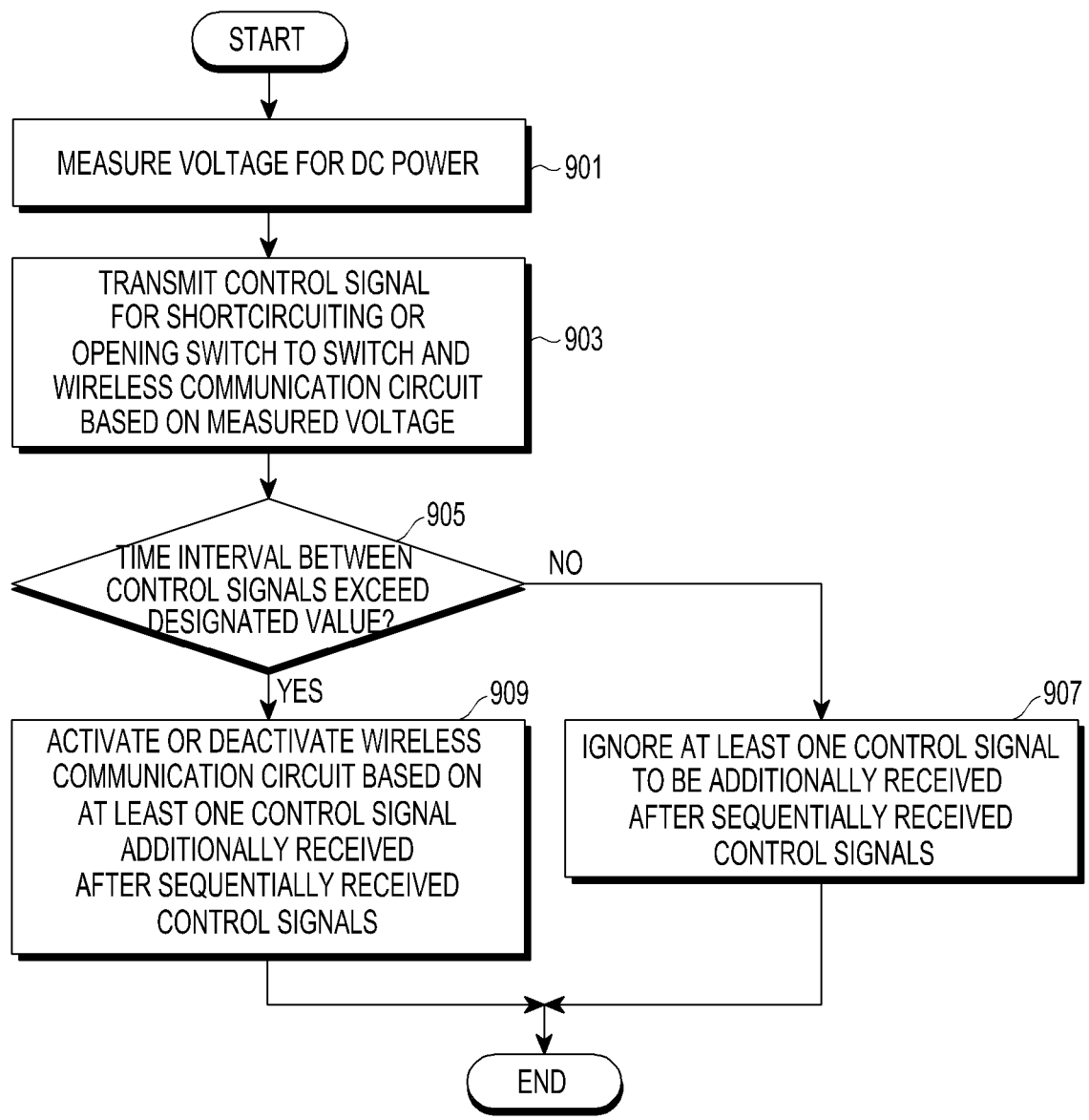
FIG. 9A is an exemplary flowchart for a structure in which a digital pen changes a state of a wireless communication circuit based on a voltage with respect to DC power, according to an embodiment.
Figure 9B:
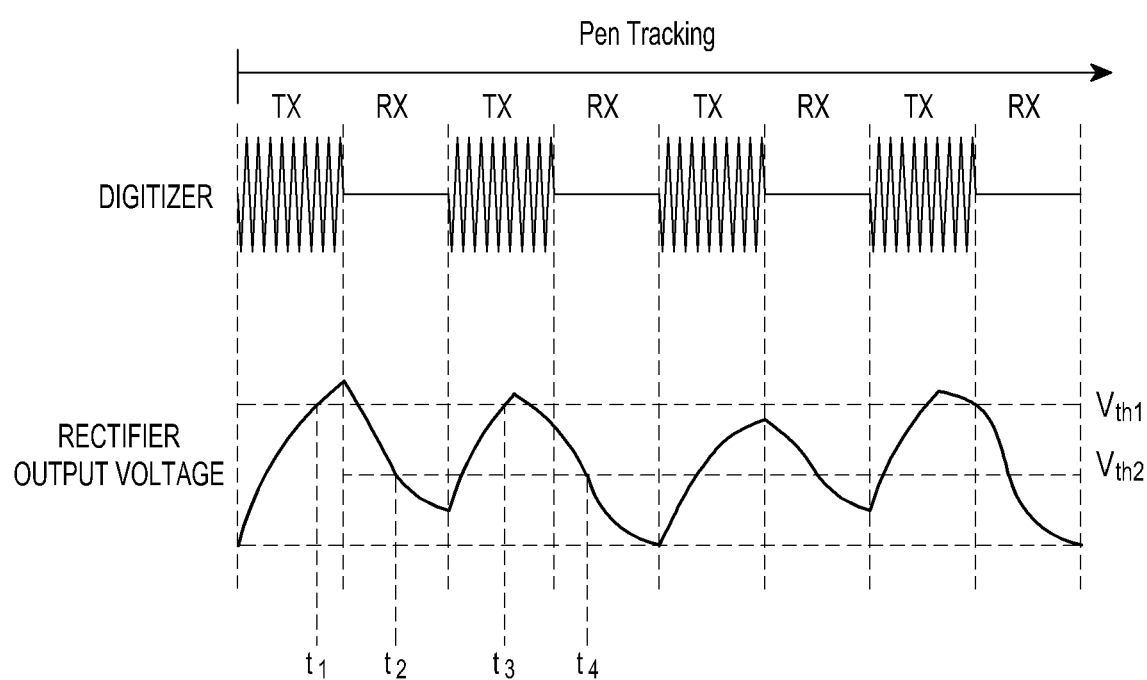
FIG. 9B is an exemplary graph for a structure in which a digital pen changes a state of a wireless communication circuit based on a voltage with respect to DC power, according to an embodiment.

FIG. 9A is an exemplary flowchart for a structure in which a digital pen changes a state of a wireless communication circuit based on a voltage with respect to DC power, according to an embodiment. FIG. 9B is an exemplary graph for a structure in which a digital pen changes a state of a wireless communication circuit based on a voltage with respect to DC power, according to an embodiment.

A digital pen (e.g., the digital pen 220 of FIG. 2 or the digital pen 500 of FIG. 5) according to various embodiments may include a housing (e.g., the pen housing 300 of FIG. 4) elongated between a first end portion (e.g., the first end portion 300a of FIG. 4) and a second end portion (e.g., the second end portion 300b of FIG. 4), a resonant circuit (e.g., the coil portion 320 of FIG. 1 or the resonant circuit 501 of FIG. 5) including a coil disposed in the housing, the wireless communication circuit 506 disposed in the housing, the rectifier 502 for rectifying AC power received through the resonant circuit 501 into AC power, a battery (e.g., the battery 289 of FIG. 2 or the battery 505 of FIG. 5) charged using the DC power, the switch 504 for selectively connecting the rectifier with the battery, and/or the voltage detector 503.

In operation 901, the voltage detector 503 may measure a voltage with respect to DC power. For example, the voltage detector 503 may measure a voltage with respect to DC power received from the rectifier. In operation 903, the voltage detector 503 may transmit a control signal to the switch and the wireless communication circuit based on the voltage measured by the voltage detector.

In operation 903, the control signal for turning on or off the switch may be transmitted to the switch and the wireless communication circuit based on the measured voltage. For example, the control signal may include a control signal of a first type for turning on the switch 504 and a control signal of a second type for turning off the switch 504. Referring to FIG. 9B, at the time $t_1$ at which the voltage with respect to the DC power exceeds $V_{th1}$, the voltage detector 503 may transmit the control signal of the first type for turning on the switch 504 to the switch 504 and the wireless communication circuit 506. At the time $t_2$ at which the voltage with respect to the DC power exceeds $V_{th2}$, the voltage detector 503 may transmit the control signal of the second type for turning off the switch 504 to the switch 504 and the wireless communication circuit 506.

In operation 905, the wireless communication circuit 506 may determine whether a time interval between the control signals exceeds a designated value. For example, the wireless communication circuit 506 may determine whether a time interval between a first control signal at $t_1$ and a second control signal at $t_2$ exceeds a designated value. Alternatively, the wireless communication circuit 506 may determine whether a time interval between the first control signal at $t_3$ and a third control signal at $t_3$ exceeds a designated value.

In operation 907, when the time interval between the control signals is less than or equal to the designated value, the wireless communication circuit 506 may ignore at least one control signal to be additionally received after sequentially received control signals. For example, when a time interval between $t_1$ and $t_2$ is less than or equal to the designated value, the wireless communication circuit 506 may maintain the sleep state without activating the wireless communication circuit 506 even when receiving control signals generated at $t_3$ and $t_4$ after $t_2$. Alternatively, the wireless communication circuit 516 may determine whether the number of times a control signal is received within a specific time after the first control signal received first among a plurality of control signals sequentially received is greater than or equal to a designated value. When determining that the number of times the control signals are received within the specific time after the first control signal is greater than or equal to the designated value, the wireless communication circuit 506 may maintain the sleep state without activating the wireless communication circuit 506 even when receiving the control signals at $t_3$ and $t_4$ after $t_2$.

In operation 909, the at least one control signal additionally received after the sequentially received control signals may be transmitted to the switch and the wireless communication circuit, thus activating and deactivating the wireless communication circuit 506 based on the transmitted at least one control signal. For example, when the time interval between $t_1$ and $t_2$ exceeds the designated value, the wireless communication circuit 506 may be activated or deactivated according to the control signals generated at $t_3$ and $t_4$ after $t_2$. A detailed description related to a digital pen described before the description of FIG. 9 may also be applied to FIGS. 9A and 9B, and thus will not be provided at this time.

An electronic device (e.g., the digital pen 201 or the digital pen 500) according to various embodiments may include a housing (e.g., the pen housing 300) elongated between a first end portion and a second end portion, a resonant circuit (e.g., the resonant circuit 501) including a coil disposed in the housing 300, a wireless communication circuit (e.g., the wireless communication circuit 506) disposed in the housing 300, a rectifier (e.g., the rectifier 502 of FIG. 5) disposed in the housing and configured to rectify an alternating-current (AC) power received through the resonant circuit to direct-current (DC) power, a voltage detector (e.g., the voltage detector 502 of FIG. 5) disposed in the housing and configured to measure a voltage for the DC power and transmit a control signal for changing a state of the wireless communication circuit to a control circuit based on the measured voltage, and the control circuit (e.g., the control circuit 516 of FIG. 5) disposed in the housing and electrically connected to the voltage detector and the wireless communication circuit, in which the control circuit 516 is configured to change the state of the wireless communication circuit at least partially based on a number of times a control signal is sequentially received within a specific time after reception of a first control signal from the voltage detector. The control circuit 220 according to an embodiment may be configured not to change a sleep state of the wireless communication circuit into a wake-up state when the number within the specific time is in a first range. The voltage detector 502 according to an embodiment may be configured to transmit a plurality of control signals to the control circuit at a plurality of time points at which the voltage for the DC power exceeds a threshold voltage, and the control circuit 220 may be configured to identify a control signal received first among the plurality of control signals as a first control signal. The control circuit 220 according to an embodiment may be configured to determine that the number is in the first range when the number is greater than or equal to a designated value and determine that the electronic device 201 is not located in an inner space of an external electronic device (e.g., the electronic device 101) when determining that the number is in the first range. The control circuit 220 according to an embodiment may be configured to determine that the number is in a second range when the number is less than the designated value and to change the sleep state of the wireless communication circuit into the wake-up state when the number is in the second range.

The control circuit 220 according to an embodiment may be configured to determine that the electronic device is located in the inner space of the external electronic device when determining that the number is in the second range. The resonant circuit 501 according to an embodiment may be configured to receive the AC power at a first frequency and receive the AC power at a second frequency that is different from the first frequency as the resonant circuit is electrically connected to a charging circuit. The resonant circuit 501 according to an embodiment may be configured to receive the AC power at a second frequency and receive the AC power at a first frequency that is different from the second frequency as the resonant circuit and a charging circuit are electrically disconnected.

A method for controlling an electronic device according to various embodiments may include receiving an AC power by using a resonant circuit, rectifying the AC power received through the resonant circuit to direct-current (DC) power, by using a rectifier, measuring a voltage for DC power by using a voltage detector, transmitting a control signal for changing a state of a wireless communication circuit to a control circuit based on the measured voltage, and changing the state of the wireless communication circuit at least partially based on a number of times a control signal is sequentially received within a specific time after reception of a first control signal from the voltage detector.

The method for controlling the electronic device 201 according to an embodiment may include avoiding changing a sleep state of the wireless communication circuit 506 into a wake-up state when the number within the specific time is in a first range. The method for controlling the electronic device 201 according to an embodiment may include transmitting a plurality of control signals to the control circuit 220 by using the voltage detector 502 at a plurality of time points at which the voltage for the DC power exceeds a threshold voltage, and identifying a control signal received first among the plurality of control signals as a first control signal. The method for controlling the electronic device 201 according to an embodiment may include determining that the number is in the first range when the number is greater than or equal to a designated value and determining that the electronic device 201 is not located in an inner space of an external electronic device when determining that the number is in the first range. The method for controlling the electronic device 201 according to an embodiment may include changing the sleep state of the wireless communication circuit into the wake-up state when the number within the specific time is in a second range that is different from the first range. The method for controlling the electronic device 201 according to an embodiment may include determining that the electronic device is located in the inner space of the external electronic device when determining that the number is in the second range. The method for controlling the electronic device 201 according to an embodiment may include receiving the AC power at a first frequency through the resonant circuit and receiving the AC power at a second frequency that is different from the first frequency through the resonant circuit as the resonant circuit is electrically connected to a charging circuit of the external electronic device. The method for controlling the electronic device according to an embodiment may include receiving the AC power at a second frequency through the resonant circuit and receiving the AC power at a first frequency that is different from the second frequency through the resonant circuit as the resonant circuit and a charging circuit are electrically disconnected.

The electronic device 201 according to various embodiments may include the housing 300 elongated between a first end portion and a second end portion, the resonant circuit 501 including a coil disposed in the housing 300, the wireless communication circuit 506 disposed in the housing, the rectifier 502 configured to rectify AC power received through the resonant circuit 501 to DC power, the battery

505 charged using the DC power, the switch 504 configured to selectively connect the rectifier with the battery, the voltage detector 503 configured to measure a voltage for the DC power and transmit a control signal for turning the switch on or off to the switch and the wireless communication circuit based on the measured voltage, in which the wireless communication circuit 506 is configured to ignore at least one control signal to be additionally received after sequentially received control signals when a time interval between the control signals sequentially received from the voltage detector 503 is less than or equal to a designated value.

The voltage detector 503 according to an embodiment may be configured to transmit a control signal of a first type for turning the switch 504 on to the switch 504 when the measured voltage is greater than or equal to a threshold voltage and transmit a control signal of a second type for turning the switch off to the switch 504 when the measured voltage is less than the threshold voltage. The wireless communication circuit 506 according to an embodiment may be configured to ignore at least one control signal to be additionally received after the control signal of the first type and the control signal of the second type, which are sequentially received from the voltage detector 503, when a time interval between the control signal of the first type and the control signal of the second type, which are sequentially received, is less than or equal to a designated value. The wireless communication circuit 506 according to an embodiment may transmit the at least one control signal additionally received after control signals sequentially received from the voltage detector 503, to the switch 504 and the wireless communication circuit 506 when a time interval between the control signals exceeds a designated value.

A method for controlling the electronic device 201 including the housing 300 elongated between a first end portion and a second end portion, the resonant circuit 501 including a coil disposed in the housing 300, the wireless communication circuit 506 disposed in the housing, the rectifier 502 configured to rectify AC power received through the resonant circuit 501 to DC power, the battery 505 charged using the DC power, the switch 504 configured to selectively connect the rectifier with the battery, and the voltage detector 503, according to various embodiments, includes measuring, by the voltage detector 503, a voltage for the DC power, transmitting, by the voltage detector, a control signal for turning the switch on or off to the switch and the wireless communication circuit 506 based on the measured voltage, and ignoring, by the wireless communication circuit 506, at least one control signal to be additionally received after sequentially received control signals when a time interval between the control signals sequentially received from the voltage detector 503 is less than or equal to a designated value.

The method for controlling the electronic device 201 according to an embodiment may include transmitting, by the voltage detector 503, a control signal of a first type for turning the switch 504 on to the switch 504 when the measured voltage is greater than or equal to a threshold voltage and transmitting, by the voltage detector 503, a control signal of a second type for turning the switch off to the switch 504 when the measured voltage is less than the threshold voltage. The method for controlling the electronic device 201 according to an embodiment may include ignoring, by the wireless communication circuit 506, at least one control signal to be additionally received after the control signal of the first type and the control signal of the second type, which are sequentially received from the voltage detector 503, when a time interval between the control signal of the first type and the control signal of the second type, which are sequentially received, is less than or equal to a designated value. The method for controlling the electronic device 201 according to an embodiment may include transmitting, by the wireless communication circuit 506, the at least one control signal additionally received after control signals sequentially received from the voltage detector 503, to the switch 504 and the wireless communication circuit 506 when a time interval between the control signals exceeds a designated value.

An electronic device according to various embodiments may be one of various types of electronic devices, according to various embodiments of the present disclosure. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a housing elongated between a first end portion and a second end portion;
   a resonant circuit comprising a coil disposed in the housing;
   a wireless communication circuit disposed in the housing;
   a rectifier disposed in the housing and configured to rectify an alternating-current (AC) power received through the resonant circuit to direct-current (DC) power; and
   a voltage detector disposed in the housing and configured to measure a voltage for the DC power and transmit a control signal for changing a state of the wireless communication circuit to a control circuit based on the measured voltage, and the control circuit being disposed in the housing and electrically connected to the voltage detector and the wireless communication circuit,
   wherein the control circuit is configured to change the state of the wireless communication circuit at least partially based on a number of times a control signal is sequentially received within a specific time after reception of a first control signal from the voltage detector.

2. The electronic device of claim 1, wherein the control circuit is further configured not to change a sleep state of the wireless communication circuit into a wake-up state when the number within the specific time is in a first range.

3. The electronic device of claim 2,
   wherein the voltage detector is configured to transmit a plurality of control signals to the control circuit at a plurality of time points at which the voltage for the DC power exceeds a threshold voltage, and
   wherein the control circuit is further configured to identify a control signal received first among the plurality of control signals as a first control signal.

4. The electronic device of claim 3, wherein the control circuit is further configured to:
   determine that the number is in the first range when the number is greater than or equal to a designated value; and
   determine that the electronic device is not located in an inner space of an external electronic device when determining that the number is in the first range.

5. The electronic device of claim 3, wherein the control circuit is further configured to:
   determine that the number is in a second range when the number is less than a designated value; and
   change the sleep state of the wireless communication circuit into the wake-up state when the number is in the second range.

6. The electronic device of claim 5, wherein the control circuit is further configured to determine that the electronic device is located in an inner space of an external electronic device when determining that the number is in the second range.

7. The electronic device of claim 1, wherein the resonant circuit is configured to:
   receive the AC power at a first frequency; and
   receive the AC power at a second frequency that is different from the first frequency as the resonant circuit is electrically connected to a charging circuit.

8. The electronic device of claim 1, wherein the resonant circuit is further configured to:
   receive the AC power at a second frequency; and
   receive the AC power at a first frequency that is different from the second frequency as the resonant circuit and a charging circuit are electrically disconnected.

9. A method for controlling an electronic device, the method comprising:
   receiving an alternating-current (AC) power by using a resonant circuit;
   rectifying the AC power received through the resonant circuit to direct-current (DC) power, by using a rectifier;
   measuring a voltage for direct-current (DC) power by using a voltage detector;
   transmitting a control signal for changing a state of a wireless communication circuit to a control circuit based on the measured voltage; and changing the state of the wireless communication circuit at least partially based on a number of times a control signal is sequentially received within a specific time after reception of a first control signal from the voltage detector.

10. The method of claim 9, further comprising:

avoiding changing a sleep state of the wireless communication circuit into a wake-up state when the number within the specific time is in a first range.

11. The method of claim 10, further comprising:

transmitting a plurality of control signals to the control circuit at a plurality of time points at which the voltage for the DC power exceeds a threshold voltage, by using the voltage detector; and identifying a control signal received first among the plurality of control signals as a first control signal.

12. The method of claim 11, further comprising:

determining that the number is in the first range when the number is greater than or equal to a designated value; and determining that the electronic device is not located in an inner space of an external electronic device when determining that the number is in the first range.

13. The method of claim 11, further comprising:

changing the sleep state of the wireless communication circuit into the wake-up state when the number within the specific time is in a second range.

14. The method of claim 13, further comprising:

determining, by the control circuit, that the electronic device is located in an inner space of an external electronic device when determining that the number is in the second range.

15. The method of claim 9, further comprising:

receiving the AC power at a first frequency through the resonant circuit; and receiving the AC power at a second frequency that is different from the first frequency through the resonant circuit as the resonant circuit is electrically connected to a charging circuit of an external electronic device.

* * * * *